United States Patent
Rombach et al.

(10) Patent No.: US 9,681,229 B2
(45) Date of Patent: *Jun. 13, 2017

(54) MICROPHONE ARRANGEMENT

(71) Applicant: Epcos AG, Munich (DE)

(72) Inventors: Pirmin Hermann Otto Rombach, Kongens Lyngby (DK); Daifi Haoues Sassene, Vaerlöse (DK)

(73) Assignee: TDK Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/138,657

(22) Filed: Apr. 26, 2016

(65) Prior Publication Data

US 2016/0241958 A1    Aug. 18, 2016

Related U.S. Application Data

(63) Continuation of application No. 13/980,700, filed as application No. PCT/EP2012/050978 on Jan. 23, 2012, now Pat. No. 9,357,294.

(30) Foreign Application Priority Data

Feb. 7, 2011 (DE) .......... 10 2011 010 506

(51) Int. Cl.
*H03G 11/00* (2006.01)
*H04R 3/00* (2006.01)
(Continued)

(52) U.S. Cl.
CPC .............. *H04R 3/007* (2013.01); *H02M 3/07* (2013.01); *H04R 3/00* (2013.01); *H04R 19/04* (2013.01);
(Continued)

(58) Field of Classification Search
CPC .......... H04R 5/027; H04R 29/00; H04R 1/08; H04R 3/005; H04R 3/002; H04R 3/00; H04R 19/04; H04R 1/406; H04R 9/08; H04R 2201/003; H04R 19/005; H04R 2499/11; H04R 29/004; H04R 3/007; H04R 1/04; H04R 17/02; H04R 19/02; H04R 2460/03; H04R 2499/15; H04R 25/30
(Continued)

(56) References Cited

U.S. PATENT DOCUMENTS 5,377,273 A    12/1994 Sutton
7,671,664 B1    3/2010 Moscaluk
(Continued)

FOREIGN PATENT DOCUMENTS

WO    WO 2009/135815    11/2009

OTHER PUBLICATIONS

International Search Report corresponding to co-pending International Patent Application Serial No. PCT/EP2012/050978, European Patent Office, dated Apr. 2, 2012 (2 pages).

*Primary Examiner* — Akelaw Teshale
(74) *Attorney, Agent, or Firm* — Nixon Peabody LLP (57) ABSTRACT

The present invention relates to a microphone arrangement (M) which has a charge pump (LP), which produces a DC voltage, a transducer (WA), which converts acoustic signals into electrical signals and which is connected to the charge pump (LP), and a control unit (VCLFS), which controls the charge pump (LP) and which adjusts the DC voltage produced by the charge pump (LP).

23 Claims, 5 Drawing Sheets

(51) Int. Cl.
    *H04R 19/04*     (2006.01)
    *H02M 3/07*      (2006.01)
    *H04R 29/00*     (2006.01)

(52) U.S. Cl.
    CPC ..... *H04R 29/004* (2013.01); *H04R 2201/003* (2013.01); *H04R 2499/11* (2013.01)

(58) Field of Classification Search
    USPC .......................... 381/11–115, 122, 155, 323
    See application file for complete search history.

(56) References Cited

U.S. PATENT DOCUMENTS

| | | | | |
|---|---|---|---|---|
| 8,876,003 | B2* | 11/2014 | McKelvey | G06Q 20/322 |
| | | | | 235/435 |
| 2008/0174372 | A1 | 7/2008 | Tucker | |
| 2010/0158274 | A1 | 6/2010 | Suvanto | |
| 2010/0172517 | A1* | 7/2010 | Wu | H04R 3/007 |
| | | | | 381/122 |
| 2010/0246859 | A1* | 9/2010 | David | H02M 3/07 |
| | | | | 381/120 |
| 2010/0329487 | A1 | 12/2010 | David | |
| 2011/0170714 | A1* | 7/2011 | Hanzlik | H02M 3/07 |
| | | | | 381/111 |
| 2011/0200212 | A1* | 8/2011 | Wismar | H02M 3/073 |
| | | | | 381/174 |
| 2013/0129133 | A1 | 5/2013 | Inoda | |
| 2014/0003609 | A1* | 1/2014 | Rombach | H04R 3/00 |
| | | | | 381/58 |

* cited by examiner

MICROPHONE ARRANGEMENT

CROSS-REFERENCE TO RELATED APPLICATIONS

This application is a continuation of U.S. patent application Ser. No. 13/980,700, filed Sep. 23, 2013, now allowed, which is a U.S. National Stage of International Application No. PCT/EP2012/050978, filed Jan. 23, 2012, which claims the benefit of Germany Patent Application No. 10 2011 010 506.9, filed on Feb. 7, 2011, both of which are incorporated herein by reference in their entireties.

The invention relates to a microphone arrangement which has a transducer for converting acoustic signals into electrical signals and can accordingly be used as a microphone.

MEMS microphones can be used in mobile telephones. It is important here that the MEMS microphone is operational directly after it is switched on. Start-up times of less than 50 ms are the aim.

A transducer in an MEMS microphone has a capacitive element, wherein a voltage is applied between a fixed and a moving electrode. After the microphone is switched on, said voltage needs to be built up as quickly as possible. Furthermore, said voltage can be higher than the voltage which is produced by a battery for supplying power to the mobile telephone. For this reason, so-called charge pumps, which apply the desired voltage between the electrodes of the transducer, are used.

WO 2009/135815 A1 describes a charge pump which can be connected to an electro-acoustic transducer in an MEMS microphone. The circuit described there is configured in such a way that, if too high a voltage is produced by the charge pump, a current flows away into a regulable current source and the charge pump does not reach its nominal voltage. However, the circuit exhibits voltage fluctuations at the output since the operating point of the charge pump is on a current/voltage edge.

It is now the object of the present invention to provide a microphone arrangement which is more stable and in which the voltage applied to the transducer can be built up in a stable manner within a short time.

This object is achieved by means of a microphone arrangement having the features of claim 1. Advantageous configurations of the invention emerge from further claims.

According to the invention, a microphone arrangement is proposed which has a charge pump, which produces a DC voltage, a transducer, which converts acoustic signals into electrical signals and which is connected to the charge pump, and a control unit, which controls the charge pump and which adjusts the DC voltage produced by the charge pump.

A charge pump is an electrical circuit to which an input voltage can be applied and which produces an electrical output voltage which is higher than the input voltage, wherein the input and output voltages are DC voltages. In the case of a charge pump, the output voltage is produced by means of capacitors and by periodic toggling of switches. A charge pump may also have diodes.

The control unit makes it possible, according to the invention, to adjust the DC voltage produced by the charge pump. For this purpose, the control unit can vary the level of the input voltage which is applied to the charge pump and/or the frequency at which switches in the charge pump are toggled. If a higher input voltage is applied, this leads to a higher output voltage from the charge pump. If the toggling frequency in the charge pump is increased, a rise time, in which the voltage in the charge pump is built up, is reduced as a result.

In one embodiment, the maximum DC voltage able to be produced by the charge pump is larger than the optimum operating voltage of the transducer. The optimum operating voltage $V_{BIAS}$ is the voltage for which the transducer has been designed. Accordingly, after the microphone is switched on, firstly a maximum producible DC voltage can be produced by the charge pump, which DC voltage ensures that the voltage applied to the transducer is built up very quickly. In a second phase after the microphone is switched on, the DC voltage produced by the charge pump can be lowered to an absolute value which is lower than the absolute value of the maximum producible DC voltage. In this way, the time for applying the voltage to the transducer can be minimized.

The transducer is designed for an optimum operating voltage $V_{BIAS}$. Preferably, in the second phase the charge pump produces a DC voltage which corresponds to said voltage $V_{BIAS}$. The optimum operating voltage of the transducer is substantially predefined by the geometry, the material properties and an impressed mechanical re-tensioning of the two electrodes.

Various possibilities are conceivable for controlling the charge pump by means of the control unit. These include a continuous feedback circuit, a single feedback circuit and a time-based circuit.

For a continuous feedback circuit, the microphone arrangement can also have a voltage divider, a reference voltage source and a differential amplifier.

The voltage divider can be linked to that path which interconnects the charge pump with the transducer. The voltage divider can be a series circuit of diodes or a series circuit of capacitors, for example. Alternatively, the voltage divider can have a plurality of diodes connected in series and also a plurality of capacitors connected in series, wherein the diodes are arranged in a first path and the capacitors are arranged in a second path, which is connected in parallel with the first path.

The reference voltage source can produce a DC voltage with a fixed absolute value. Said DC voltage multiplied by a pump factor corresponds to the optimum operating voltage $V_{BIAS}$ of the transducer.

Furthermore, the differential amplifier can be interconnected with the reference voltage source and with the voltage divider. The voltage divider supplies a voltage which is proportional to the voltage produced at present by the charge pump. Now the differential amplifier outputs a signal which is proportional to the difference between the voltage produced at present by the charge pump and the optimum operating voltage $V_{BIAS}$.

The output signal from the differential amplifier can be applied to the control unit. Accordingly, the control unit continually receives feedback via the differential amplifier, which feedback indicates whether the voltage produced by the charge pump is too high or too low. The control unit can continuously adapt the voltage produced by the charge pump in accordance with said feedback. For this purpose, the control unit regulates the level of the input voltage for the charge pump and/or the frequency at which the charge pump is operated. A higher input voltage leads to a higher output voltage. If the frequency of the charge pump is increased, the rise time is reduced as a result.

For a feedback circuit single, the microphone arrangement also has a trigger in addition to the voltage divider, the reference voltage source and the differential amplifier. The two inputs of the differential amplifier can be connected to the voltage divider and the reference voltage source. Accordingly, the differential amplifier produces a signal which is proportional to the difference between the voltage applied to the microphone at present and the optimum operating voltage. Said signal is output at the output of the differential amplifier and said output can be connected to the trigger.

Moreover, the trigger can be connected to the control unit and to at least one switch. In one exemplary embodiment, the switch connects the voltage divider to the connecting path from charge pump to transducer in a closed state. In an open state, the switch decouples the voltage divider from the charge pump and the transducer.

If the voltage divider is decoupled from the charge pump, then no leakage currents can flow away via the voltage divider and the charge pump can be operated with low losses. In contrast to WO 2009/135815, in which the voltage divider is always interconnected with the charge pump, here the voltage divider does not contribute to fluctuations in sensitivity in the microphone. In this way, a substantial disturbance mechanism can be eliminated and stable operation of the microphone arrangement can be ensured.

In one embodiment, the trigger opens the switch as soon as the signal produced by the differential amplifier reaches a threshold value. Said reaching of the threshold value corresponds to the transition from the first phase, in which a maximum DC voltage is produced by the charge pump, to a second phase, wherein, in the second phase, a DC voltage is produced by the charge pump, which DC voltage is smaller than the maximum DC voltage able to be produced by the charge pump. The control unit is likewise connected to the trigger and adjusts the voltage produced by the charge pump depending on the signal which is output by the differential amplifier via the trigger.

In a third embodiment of the present invention, a time-based circuit is selected. This can have means for measuring the time which has elapsed since the microphone arrangement was switched on. Preferably, the means for measuring the time are connected to the control unit. After a stipulated time, the control unit reduces the voltage produced by the charge pump from a maximum value to a value which is lower than the maximum value and is preferably equal to $V_{BIAS}$.

Furthermore, the charge pump and the transducer can be connected to one another via a high-impedance circuit. Said high-impedance circuit can have a pair of cross-coupled diodes. The oppositely connected diodes have an impedance in the range of TΩ during operation of the microphone. In this way, it is ensured that the capacitor of the transducer cannot be discharged during operation and therefore remains at a constant charge.

The transducer can also be connected to a path in which a capacitor is connected in series with an amplifier. An electrical signal, which the transducer has converted from an acoustic signal, can be transmitted to an input and output unit of the microphone arrangement via said path.

In one exemplary embodiment, the transducer has a fixed electrode and a moving electrode, for example a diaphragm. The charge pump produces a voltage which is applied between said two electrodes.

The invention will be explained in more detail below on the basis of exemplary embodiments and the associated figures. The figures show various exemplary embodiments of the invention on the basis of schematic illustrations which are not drawn to scale.

Figure 1:
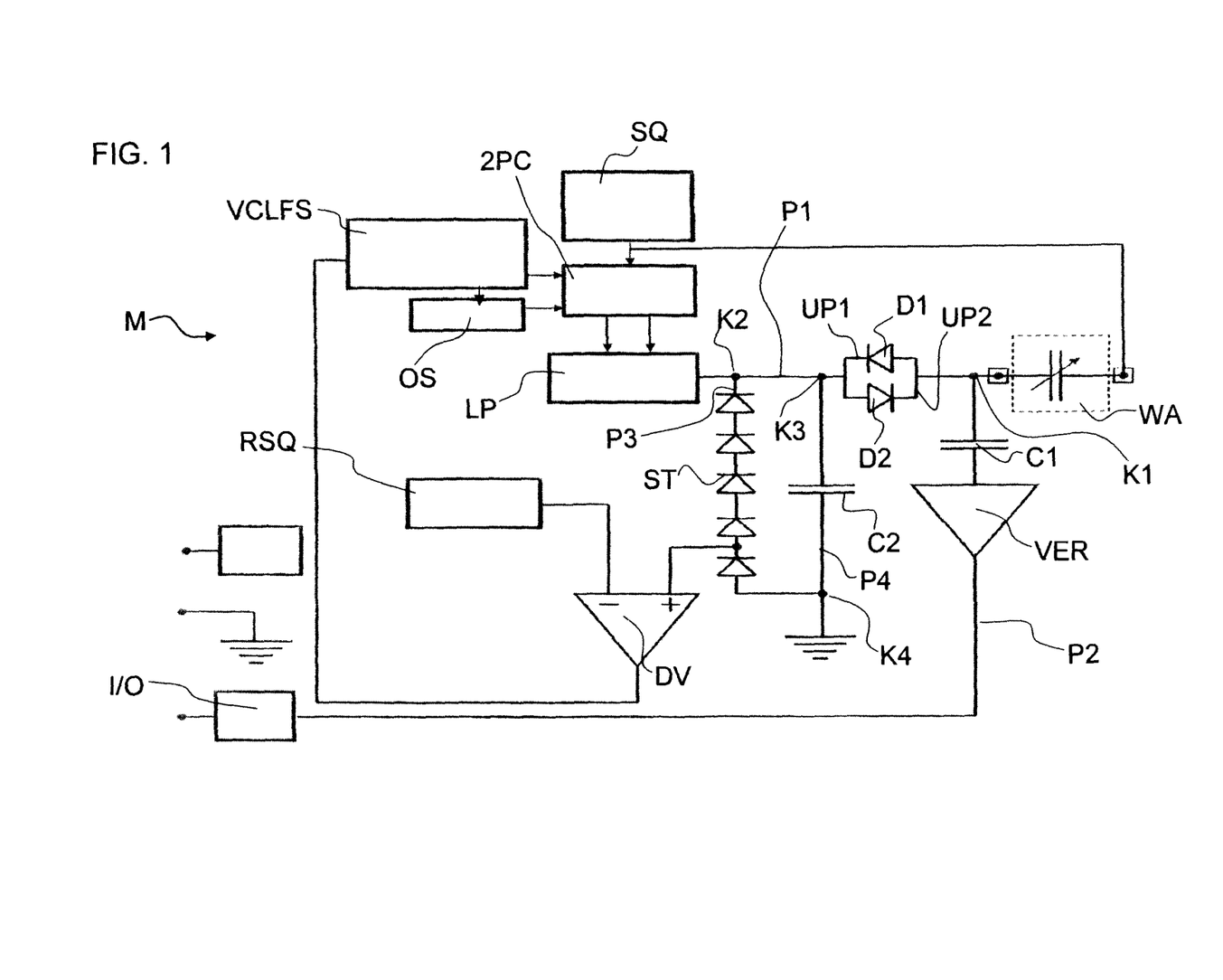
FIG. 1 shows a first exemplary embodiment of a microphone arrangement of the invention.

FIG. 1 shows a first exemplary embodiment of the microphone arrangement M of the invention. This is a continuous feedback circuit.

The microphone arrangement M has a transducer WA which converts acoustic signals into electrical signals. Said transducer WA has a capacitor with a fixed and a moving electrode. A bias voltage is applied between the two electrodes. The capacitor is designed for an optimum operating voltage $V_{BIAS}$.

The microphone arrangement M also has a charge pump LP. This may be a Dickson charge pump. The charge pump LP is connected to a voltage source SQ, which provides a supply voltage, via a two-phase clock 2PC.

The charge pump LP and the transducer WA are connected to one another via a first path P1.

The input of the charge pump LP is connected to the two-phase clock 2PC, the latter in turn being connected to a variable clock level and frequency shifter VCLFS. In this case, the variable clock level and frequency shifter VCLFS forms the control unit. The output signal from the variable clock level and frequency shifter VCLFS is transmitted as input signal to the two-phase clock 2PC. The two-phase clock 2PC now produces a signal which is used to control the charge pump LP. The signal level and the frequency of said signal are adjusted by means of the output signal from the variable clock level and frequency shifter VCLFS.

Furthermore, the two-phase clock 2PC is connected to an oscillator OS.

The charge pump LP is configured in such a way that it produces an output voltage which is larger than the applied input voltage. In particular, the output voltage can be larger than the supply voltage for the microphone arrangement M that is produced by a battery. The absolute value of the output voltage which is produced by the charge pump LP is determined by the variable clock level and frequency shifter VCLFS. If the signal from the variable clock level and frequency shifter VCLFS is increased in amplitude or frequency, this leads to a larger output voltage.

The voltage which is output by the charge pump LP is applied to a first electrode of the transducer WA. The second electrode of the transducer WA is connected to the voltage source SQ. Accordingly, the second electrode of the transducer WA is at a lower voltage level and a potential difference is produced between the two electrodes of the transducer WA. This makes it possible to determine a change in capacitance in the transducer WA.

The charge pump LP is interconnected with the transducer via two oppositely connected diodes D1 and D2. The first path P1 splits into two parallel subpaths UP1 and UP2, wherein in each case one of the two oppositely connected diodes D1 and D2 is arranged in each subpath UP1 and UP2. These two subpaths UP1 and UP2 form a high-impedance element, the impedance of which is—in a steady state—in the teraohmic range. In this way, it is ensured that the transducer WA is not discharged and that almost no current flows between the charge pump LP and the transducer WA.

The first path P1, which connects the transducer WA and the charge pump LP to one another, also has three nodes K1, K2 and K3.

A second path P2, in which a coupling capacitor C1 and an amplifier VER are connected in series, branches off from the first node K1. The second path P2 is connected to an input and output port I/O of the microphone arrangement M.

The second node K2 is connected to a third path P3, which has a voltage divider ST. The voltage divider ST here is a series circuit of diodes. Alternatively, it may also be a series circuit of capacitors.

A second capacitor C2 is arranged in a fourth path P4 in parallel with the voltage divider. The fourth path P4 is connected to the node K2 of the first path. The second capacitor C2 serves to filter a high-frequency voltage component which originates from the charge pump.

The third and fourth paths P3 and P4 are also linked together via a common node K4 and connected to ground.

The voltage divider ST is connected to a first input of a differential amplifier DV. The second input of the differential amplifier DV is connected to a reference voltage source RSQ. The reference voltage source RSQ produces a constant DC voltage which is proportional to the optimum operating voltage $V_{BIAS}$ of the transducer.

The differential amplifier DV also has an output. The signal which is output at this output is proportional to the difference between the two voltages applied in each case to an input of the differential amplifier DV.

The voltage which is proportional to the voltage produced at present at the charge pump LP is applied via the voltage divider ST to the first input of the differential amplifier DV. A voltage which is proportional to the optimum operating voltage $V_{BIAS}$ is applied to the second input. Accordingly, the output signal from the differential amplifier DV indicates by what value the voltage produced at present deviates from the optimum operating voltage $V_{BIAS}$. The mathematical sign of the output voltage indicates whether the voltage produced at present or the optimum operating voltage is larger in terms of absolute value.

The output of the differential amplifier DV is in turn connected to the variable clock level and frequency shifter VCLFS. Accordingly, the differential amplifier DV provides feedback to the variable clock level and frequency shifter VCLFS. The variable clock level and frequency shifter now adapts its output signal such that the voltage produced by the charge pump LP is adapted to suit the reference voltage. If, for example, the voltage produced by the charge pump LP is smaller than the desired optimum voltage $V_{BIAS}$, the amplitude of the output signal from the variable clock level and frequency shifter VCLFS is increased and thus the voltage of the charge pump LP is increased. Conversely, the voltage from the charge pump LP can also be reduced by means of a decrease in amplitude and.

Said adaptation is repeated continuously during operation of the microphone arrangement M. In this way, it can be ensured that the output voltage produced by the charge pump LP corresponds to the optimum operating voltage $V_{BIAS}$.

Almost no current flows through the voltage divider ST and the second capacitor C2. In this way, it is ensured that the charge pump LP can be operated at high impedance. Accordingly, the operating point of the microphone arrangement M is on a flat plateau in a current/voltage characteristic. Thus, the microphone arrangement M operates in a stable sensitivity range.

Figure 2:
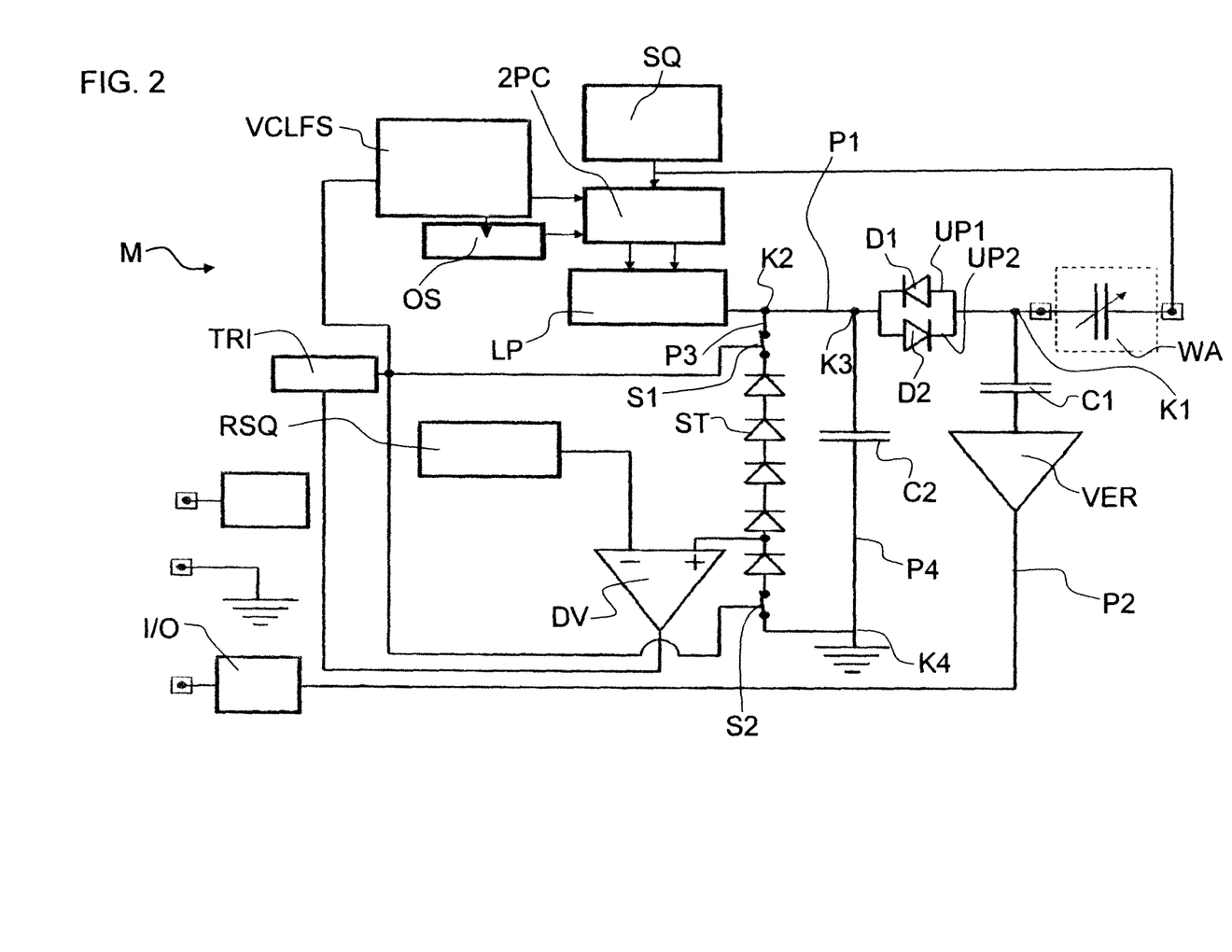
FIG. 2 shows a second exemplary embodiment of a microphone arrangement of the invention.

FIG. 2 shows a second exemplary embodiment of the present invention. This is a single feedback circuit.

In contrast to the circuit shown in FIG. 1, the output of the differential amplifier DV is not directly connected to the variable clock level and frequency shifter VCLFS but rather is connected to a trigger TRI. The circuit also has two switches S1 and S2, which are arranged in the third path P3, in which the voltage divider is arranged. In the third path P3, a first switch S1 is arranged between the diodes of the voltage divider ST and the node K2, which connects the third path P3 and the first path P1 to one another. The second switch S2 is arranged between the diodes of the voltage divider ST and the further node K4, which connects the third path to ground and to the fourth path.

The trigger TRI is connected to the two switches S1 and S2 and is used as control element for the two switches S1 and S2. Accordingly, the trigger TRI can open and close the switches S1 and S2. The trigger TRI is also connected to the variable clock level and frequency shifter VCLFS.

The output signal from the differential amplifier DV is in turn proportional to the difference between the voltage produced at present by the charge pump and the optimum operating voltage $V_{BIAS}$. If said output signal exceeds a predefined limit value, the trigger TRI opens the two switches S1 and S2. Said limit value is typically reached when the two voltages are equal.

The trigger TRI also transmits the output signal from the differential amplifier DV to the variable clock level and frequency shifter VCLFS. Said variable clock level and frequency shifter in turn controls the output voltage of the charge pump LP.

In a first phase following after the microphone arrangement M is switched on, the charge pump LP produces the maximum possible DC voltage for charging the capacitor of the transducer WA. If the present voltage now corresponds to the optimum operating voltage $V_{BIAS}$, the trigger TRI opens the switches S1 and S2. At the same time, the variable clock level and frequency shifter VCLFS regulates the output voltage of the charge pump LP to a lower level, namely that of the optimum voltage $V_{BIAS}$.

Figure 3:
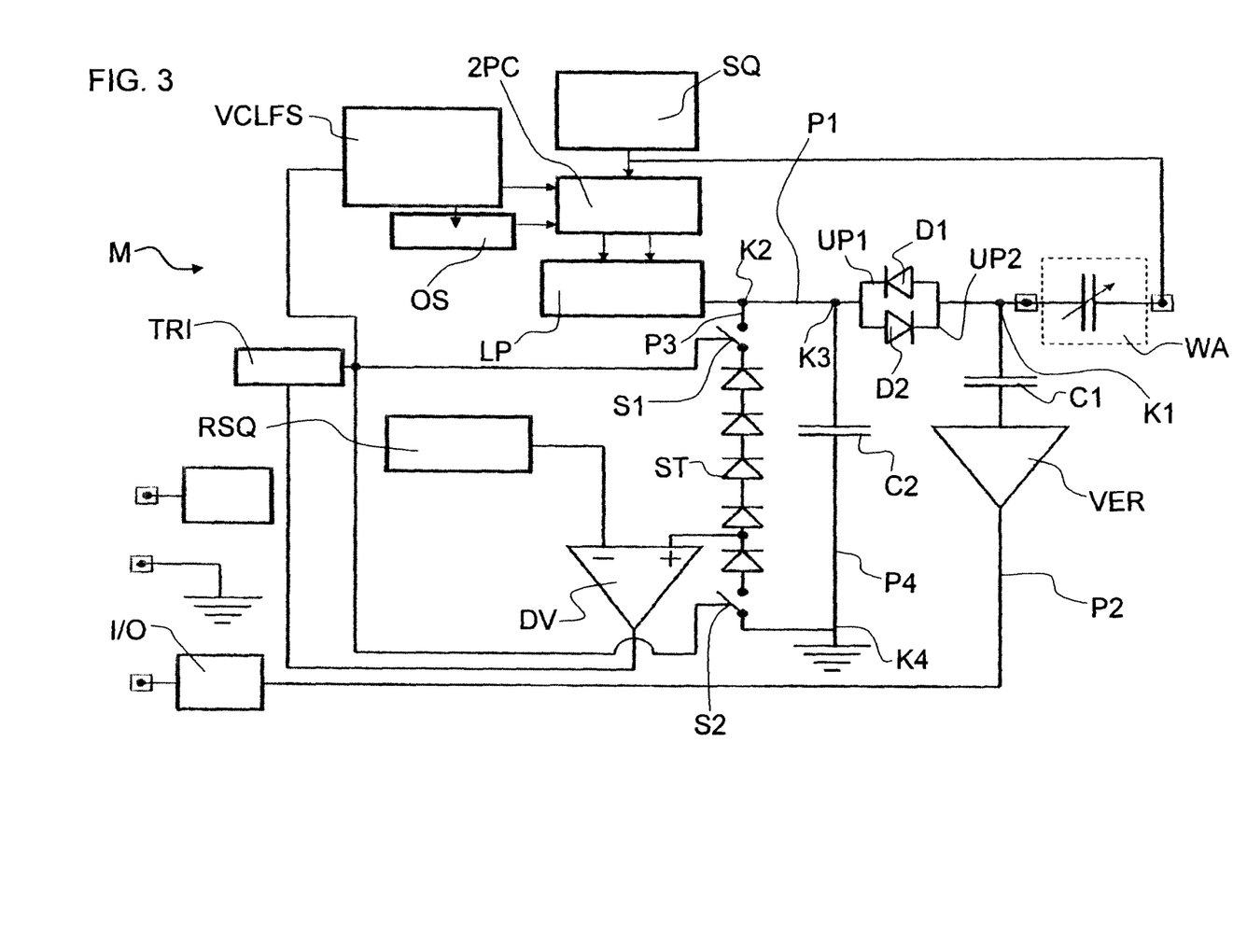
FIG. 3 shows the second exemplary embodiment in a second state.

FIG. 3 shows the exemplary embodiment shown in FIG. 2 in the second phase with open switches S1 and S2.

Now the third path P3, which has the voltage divider ST, is decoupled from the first path P1, which forms the connection between charge pump LP and transducer WA. Accordingly, no current can flow away via the voltage divider ST and influence the charge of the transducer WA.

Figure 4:
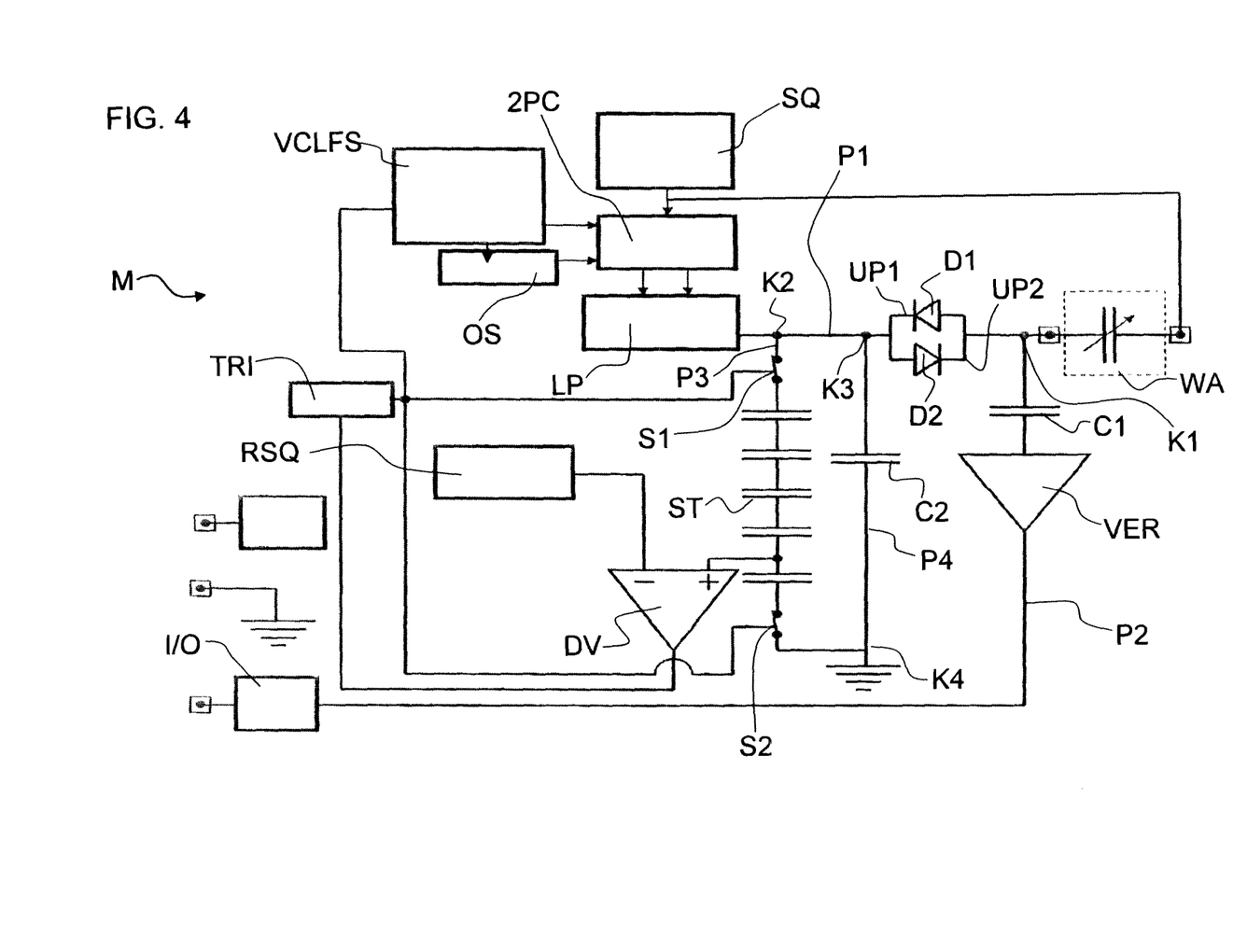
FIG. 4 shows a second variant of the second exemplary embodiment in a first state.
Figure 5:
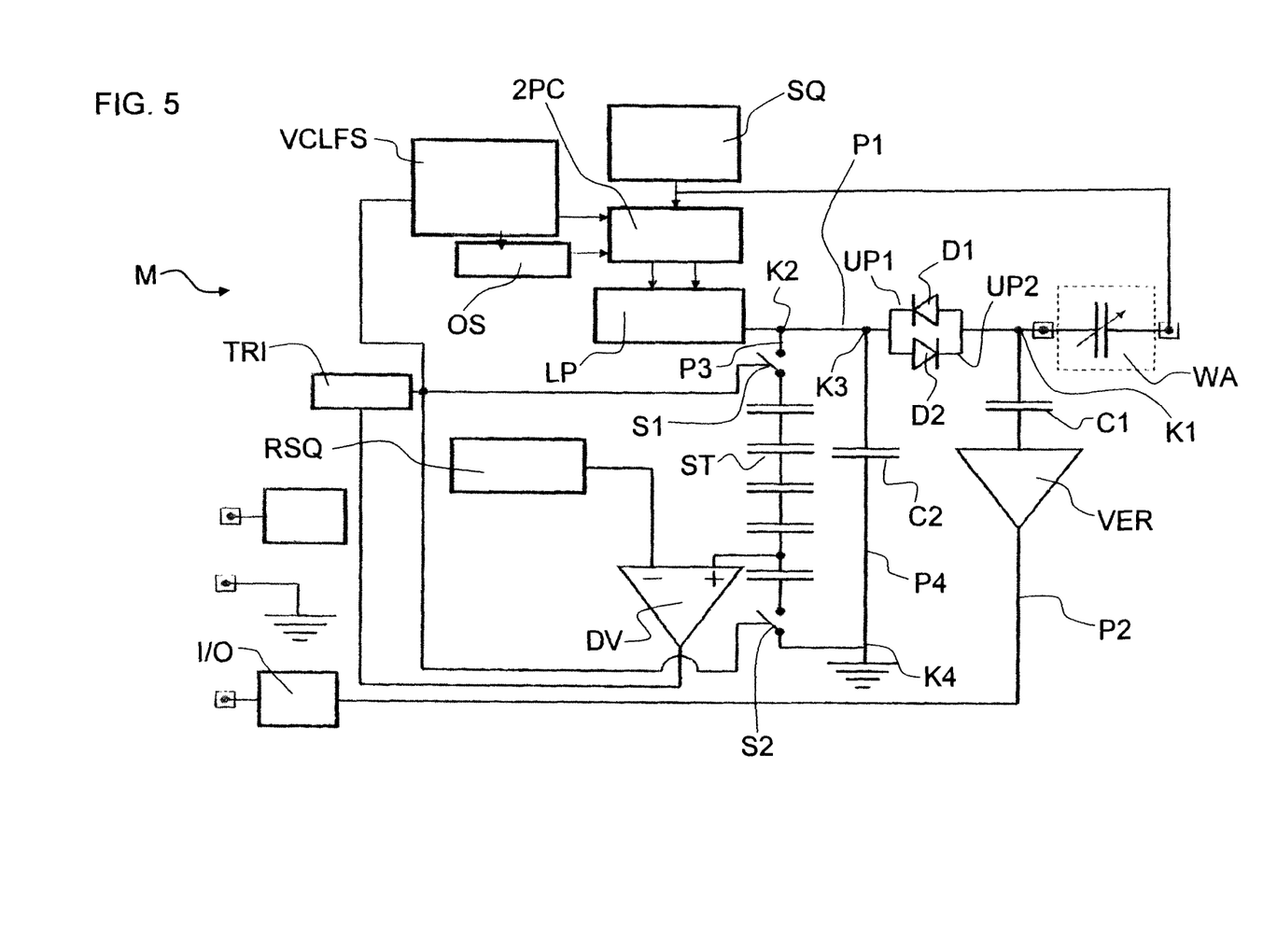
FIG. 5 shows the second variant in a second state.

FIGS. 4 and 5 show a second variant of this single feedback circuit. Here, the voltage divider ST, which has a series circuit of diodes in the first variant, is replaced by a voltage divider ST which has a series circuit of capacitors. The functional principle of the circuit corresponds to the functional principle which has already been explained in connection with FIGS. 2 and 3.

A further possibility for configuring the microphone arrangement M involves a circuit which completely dispenses with feedback and instead uses a time-based method. A circuit such as this is not illustrated in the figures. In the case of the time-based method, the circuit has means for determining the time since the microphone arrangement M was switched on. The variable clock level and frequency shifter VCLFS controls the charge pump LP with a signal, wherein the amplitude and/or frequency of the signal are dependent on the time.

In a first phase after the microphone arrangement M is switched on, a maximum output voltage from the charge pump LP is produced. After a firmly predefined time, the output voltage of the charge pump LP is reduced to the value of the optimum operating voltage $V_{BIAS}$.

The time-based method has the advantage that the circuit is significantly simplified. It is possible to dispense with a feedback loop.

The continuous or single feedback circuits shown in the first and second exemplary embodiments have the advantage that the charge pump LP can be controlled in a more targeted and stable manner. Any manufacturing tolerances in the individual components can be compensated for.

All three embodiments are characterized by a quick and stable build-up of the voltage at the transducer WA.

LIST OF REFERENCE SIGNS

M—microphone arrangement
WA—transducer
LP—charge pump
SQ—voltage source
VCLFS—variable clock level and frequency shifter
2PC two-phase clock
OS—oscillator
D1, D2—diode
P1-P4—first-fourth paths
K1-K4—nodes
UP1, UP2—subpath
C1—coupling capacitor
C2—second capacitor
VER—amplifier
I/O—input and output port
ST—voltage divider
DV—differential amplifier
RSQ—reference voltage source
TRI—trigger
S1, S2—switch

The invention claimed is:

1. A microphone arrangement having:
a charge pump, which produces a DC voltage,
a transducer, which converts acoustic signals into electrical signals and which is connected to the charge pump, and
a control unit, which controls the charge pump and which adjusts the DC voltage produced by the charge pump,
a voltage divider, which is interconnected with the charge pump and the transducer,
a reference voltage source, which produces DC voltage with a fixed absolute value,
a trigger, which is connected to the control unit and to a switch, wherein the switch interconnects the voltage divider with the charge pump and the transducer in a closed state and decouples the voltage divider from the charge pump and the transducer in an open state, and
a differential amplifier with two inputs, which outputs a signal that is proportional to the difference in the voltage being applied to the two inputs, wherein the first input is connected to the voltage divider, the second input is connected to the reference voltage source, and an output is connected to the trigger,
wherein, in a first phase after the microphone is switched on, the control unit controls the charge pump in such a way that the charge pump produces a maximum DC voltage, and
wherein, in a second phase following the first phase, the control unit controls the charge pump in such a way that the charge pump produces a DC voltage the absolute value of which is lower than the absolute value of the maximum DC voltage.

2. The microphone arrangement according to claim 1, in which the control unit regulates the input voltage of the charge pump and/or the frequency at which the charge pump is controlled.

3. The microphone arrangement according to claim 1, in which the maximum DC voltage able to be produced by the charge pump is larger than the optimum operating voltage of the transducer.

4. The microphone arrangement according to claim 1, in which the control unit can vary the absolute value and/or the frequency of a voltage applied to the charge pump.

5. The microphone arrangement according to claim 1, wherein the trigger opens the switch when the signal produced by the differential amplifier reaches a threshold value.

6. The microphone arrangement according to claim 1, wherein the control unit adjusts the voltage produced by the charge pump depending on the signal which is output by the differential amplifier.

7. The microphone arrangement according to claim 1, wherein the voltage divider has a plurality of diodes connected in series.

8. The microphone arrangement according to claim 1, wherein the voltage divider has a plurality of capacitors connected in series.

9. The microphone arrangement according to claim 1, wherein the voltage divider has a plurality of diodes connected in series and also has a plurality of capacitors connected in series, wherein the diodes are arranged in a first path and the capacitors are arranged in a second path, which is connected in parallel with the first path.

10. The microphone arrangement according to claim 1, wherein the charge pump and the transducer are connected to one another via a high-impedance circuit.

11. The microphone arrangement according to claim 10, wherein the high-impedance circuit has a pair of cross-coupled diodes.

12. The microphone arrangement according to claim 1, wherein the transducer is also interconnected with a capacitor and an amplifier.

13. The microphone arrangement according to claim 1, wherein the transducer has a fixed electrode and a moving electrode, and
wherein the voltage produced by the charge pump is applied between said two electrodes.

14. The microphone arrangement according to claim 1, wherein the control unit adjusts the voltage produced by the charge pump depending on the signal which is output by the differential amplifier.

15. The microphone arrangement according to claim 1, wherein the voltage divider has a plurality of diodes connected in series and also has a plurality of capacitors connected in series, wherein the diodes are arranged in a first path and the capacitors are arranged in a second path, which is connected in parallel with the first path.

16. A microphone arrangement having:
a charge pump, which produces a DC voltage,
a transducer, which converts acoustic signals into electrical signals and which is connected to the charge pump,
a control unit, which controls the charge pump and which adjusts the DC voltage produced by the charge pump, and
means for measuring the time since the microphone arrangement was switched on, wherein the means for measuring the time are connected to the control unit, wherein the control unit adjusts the voltage produced by the charge pump depending on the time since the microphone arrangement was switched on, wherein, in a first phase after the microphone is switched on, the control unit controls the charge pump in such a way that the charge pump produces a maximum DC voltage, and wherein, in a second phase following the first phase, the control unit controls the charge pump in such a way that the charge pump produces a DC voltage the absolute value of which is lower than the absolute value of the maximum DC voltage.

17. The microphone arrangement according to claim 16, in which the control unit regulates the input voltage of the charge pump and/or the frequency at which the charge pump is controlled.

18. The microphone arrangement according to claim 16, in which the maximum DC voltage able to be produced by the charge pump is larger than the optimum operating voltage of the transducer.

19. The microphone arrangement according to claim 16, in which the control unit can vary the absolute value and/or the frequency of a voltage applied to the charge pump.

20. The microphone arrangement according to claim 16, wherein the charge pump and the transducer are connected to one another via a high-impedance circuit.

21. The microphone arrangement according to claim 16, wherein the high-impedance circuit has a pair of cross-coupled diodes.

22. The microphone arrangement according to claim 16, wherein the transducer is also interconnected with a capacitor and an amplifier.

23. The microphone arrangement according to claim 16, wherein the transducer has a fixed electrode and a moving electrode, and wherein the voltage produced by the charge pump is applied between said two electrodes.

* * * * *